United States Patent [19]

Zago et al.

[11] Patent Number: 4,631,616
[45] Date of Patent: Dec. 23, 1986

[54] CLEANING CASSETTE FOR TAPE RECORDER AND/OR PLAYER MAGNETIC HEAD

[76] Inventors: Giovanni Zago, Via N. Aprilis, 41, 33080 San Quirino (Prov. of Pordenone); Giovanni Prataviera, Via Caorle, 4, 33170 Pordenone, both of Italy

[21] Appl. No.: 591,084

[22] Filed: Mar. 19, 1984

[30] Foreign Application Priority Data

Mar. 24, 1983 [IT]  Italy .............................. 21274/83[U]

[51] Int. Cl.⁴ .......................... G11B 5/41; A47L 25/00
[52] U.S. Cl. .................................... 360/128; 360/137; 15/210 R
[58] Field of Search .............. 360/128, 137; 15/210 R

[56] References Cited

U.S. PATENT DOCUMENTS

| | | | |
|---|---|---|---|
| 3,955,214 | 5/1976 | Post et al. | 360/128 |
| 4,442,468 | 4/1984 | d'Arc | 360/128 |
| 4,458,281 | 7/1984 | Kara | 360/128 |

FOREIGN PATENT DOCUMENTS 1319948  6/1973  United Kingdom ............... 360/128

*Primary Examiner*—John H. Wolff
*Attorney, Agent, or Firm*—Guido Modiano; Albert Josif

[57] ABSTRACT

A cleaning cassette for tape recorder and/or player magnetic heads comprises a toothed wheel of elastic yielding material frictionally engaging in use the magnetic head. The wheel is rotatively driven by a drive arrangement comprising hubs to be driven by the recorder spindles and vanes radially extending towards and engaging the vanes of the wheel. The cassette comprises also a socket accommodating a small flexible vessel containing a detergent liquid and accessible through an opening in the cassette casing.

4 Claims, 3 Drawing Figures

CLEANING CASSETTE FOR TAPE RECORDER AND/OR PLAYER MAGNETIC HEAD

BACKGROUND OF THE INVENTION

This invention relates to a cleaning device for magnetic heads of tape recorders and/or players.

It is a known fact that magnetic heads of tape recorders-players require periodic cleaning from any dust, grease, or other deposits which may collect thereon and are apt to degrade recording and playing quality.

This is, however, a fairly delicate operation which not all the users can carry out correctly, thereby the integrity of the magnetic head may be endangered.

SUMMARY OF THE INVENTION

It is an object of this invention to provide a device for cleaning magnetic heads, which can be readily applied to current design recorders-players to make the magnetic head cleaning operation independent of the user's own skill.

The device of this invention is characterized in that it comprises a rotary member provided with vanes or teeth formed of an elastic and yielding material, and adapted to frictionally engage with the magnetic head, said rotary member being driven rotatively by one, preferably two, driving cogwheels the hubs of whereof are held in torque transfer engagement with the spindles provided in the tape recorder-player for advancing the magnetic tape therein.

This device is preferably accommodated in a holder casing provided, for convenience sake, in the same dimensions and shape of an ordinary magnetic tape cassette, and further comprises a small reservoir containing an appropriate solvent to improve the magnetic head cleaning action.

BRIEF DESCRIPTION OF THE DRAWINGS

The invention will be now described with reference to the accompanying drawings illustrating by way of example a preferred embodiment thereof, and where.

DESCRIPTION OF THE PREFERRED EMBODIMENTS

Figure 1:
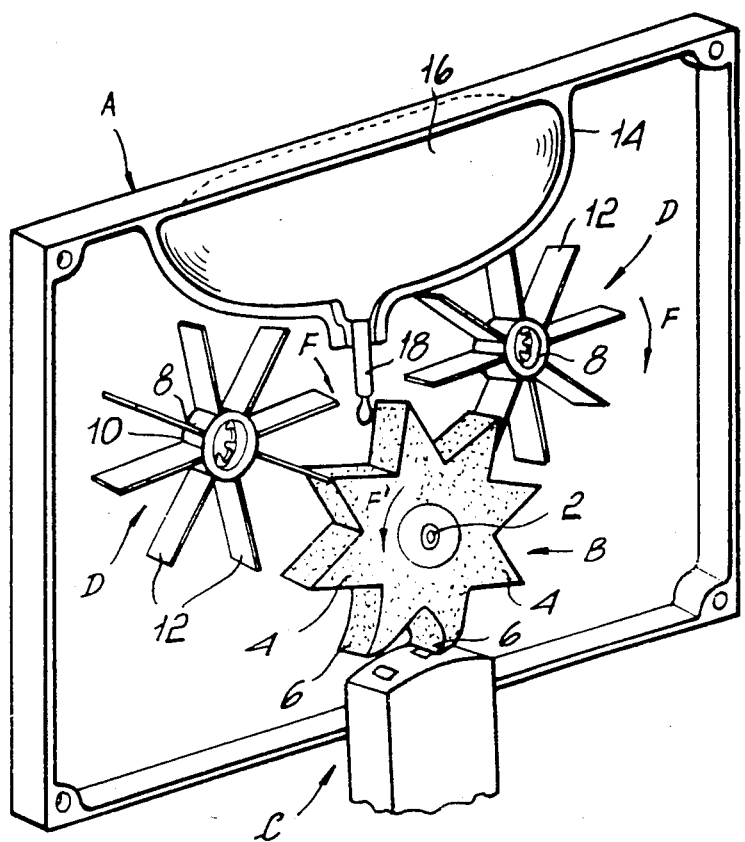
FIG. 1 is a perspective view of this magnetic head cleaning cassette with its front wall removed to show the internal components thereof.

As shown in FIG. 1, the cassette A contains a toothed wheel B made of an elastic yielding material and being set for idle rotation about a pivot pin 2, the teeth, or vanes, 4 of said wheel being adapted to frictionally engage at their ends 6 with a magnetic head C.

The toothed wheel B is driven rotatively by a drive arrangement D having hubs 8 which engage in torque transfer relationship, by means of serrations 10 provided internally to the bores in the hubs 8, with serrated spindles in the tape recorder-player. Said drive arrangement D includes vanes 12 which radially extend from said hubs 8 and, when rotated for example in a clockwise direction as shown by the arrows F, will drive the toothed wheel B in a counterclockwise diretion F' to effect cleaning of the magnetic head C.

To more conveniently wipe said magnetic head clean, the cassette A further comprises, in the upper portion thereof, a socket 14 which accommodates a small vessel 16 of a flexible material containing a suitable liquid detergent which can be delivered in drops through a small tube 18 on squeezing the vessel 16 in order to appropriately wet the teeth of the wheel B.

Figure 2:
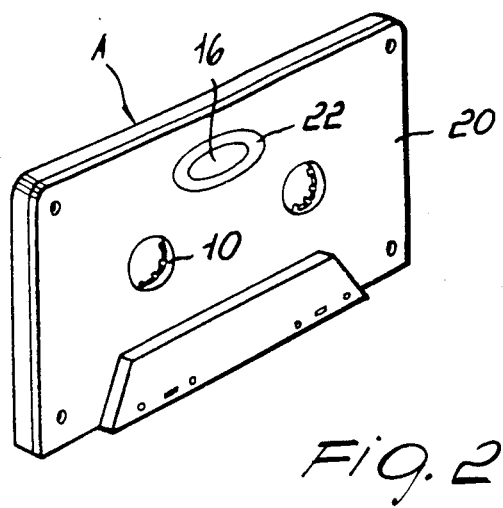
FIG. 2 shows, on a reduced scale with respect to FIG. 1, this cassette in its closed condition and as configured for practical use in accordance with a preferred embodiment thereof.

FIG. 2 shows a preferred embodiment of the cassette according to the invention for cleaning magnetic heads, which cassette has the outward appearance of an ordinary tape cassette, with the difference that its cover 20, conventionally attached thereto by means of four corner screws, is formed with an access opening 22 exposing a portion of the inside reservoir 16 which can be acted upon by the user to squeeze out some liquid detergent.

Figure 3:
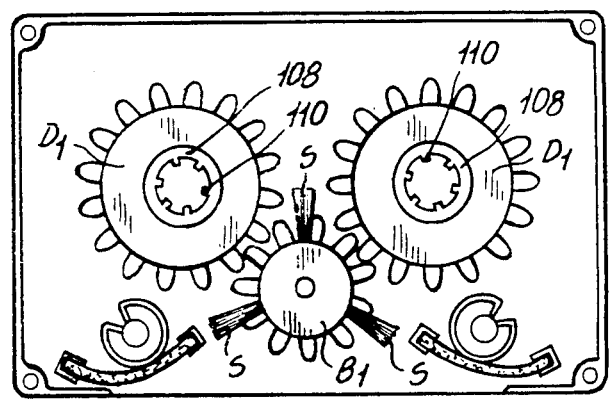
FIG. 3 shows a different embodiment of the cassette according to FIG. 1.

FIG. 3 shows a different embodiment of the cassette according to the present invention. In this figure, the transmission means now comprise two gears indicated with $D_1$, the hubs 108 thereof torque engage the recorder-player spindles through serrations 110 provided in the holes of the respective hubs 108. Both gears $D_1$ engage a third gear $B_1$ having a number of radial brushes S which, during the rotation of the gears, interfere with the magnetic head of the player.

The magnetic head cleaning cassette just described fully achieves the invention object of facilitating the cleaning operation for the ordinary user in that the user is only required to introduce the holder into the recorder-player without becoming involved in any delicate and complex procedure.

The inventive cassette advantageously lends itself to fabrication from a molded resin or light-weight metal, as do the drive arrangement D and related hubs, whereas the toothed wheel B will be formed from a suitable elastic yielding material such as a low rigidity rubber compound.

The liquid detergent reservoir would also be made of a plastic material, such as polyethylene or the like.

In practicing the invention, the cassette component parts, such as the toothed wheel B, may be constructed differently. As an example, the wheel B may comprise a light molded resin hub wherein optionally replaceable flexible blades of rubber or felt would be inserted to operate on the same inventive principle set forth hereinabove, and the holder dimensions may be altered to fit a desired magnetic tape recorder-player type or model, without departing from the true scope of the instant inventive idea.

What is claimed:

1. A device for cleaning heads of a cassette tape recorder or player, comprising:
    a cassette casing insertable into the cassette recorder or player in juxtaposition with the heads, the casing defining two apertures therethrough to accomodate spindles of the recorder or player;
    a rotary drive member associated with each said aperture of the casing, each drive member having a hub with serrations for engaging serrations of a spindle in a torque transfer relationship, and having a plurality of vanes extending radially from the hub; and
    a rotary cleaning member being rotatable about a pin, the cleaning member having elastic radially extending teeth, and the cleaning member being positioned in the casing so that the elastic teeth drivingly engage the vanes of the drive members and also may frictionally engage the heads of the recorder or player when the device is inserted therein.

2. A device as claimed in claim 1, further comprising a socket defined in the casing for accommodating a vessel having a tube extending therefrom to deliver drops of a liquid contained in the vessel to teeth of the cleaning member.

3. A device as claimed in claim 2, wherein the vessel has flexible walls so that liquid may be dispensed therefrom through the tube to the cleaning member by squeezing the vessel.

4. A device for cleaning heads of a cassette tape recorder or player, comprising:
   a cassette casing insertable into the cassette recorder or player in juxtaposition with the heads, the casing defining two apertures therethrough to accommodate spindles of the recorder or player;
   a drive gear associated with each said aperture of the casing, each gear having a hub with serrations for engaging serrations of a spindle in a torque transfer relationship, and having a plurality of gear teeth extending radially therefrom; and
   a cleaning gear being rotatable about a pin and having a plurality of gear teeth extending radially therefrom into driving engagement with the teeth of the drive gears, the cleaning gear having a plurality of brushes extending radially therefrom beyond the gear teeth, and the cleaning gear being positioned in the casing so that the brushes may frictionally engage the heads of the recorder or player when the device is inserted therein.

* * * * *